(12) United States Patent
Abbe (10) Patent No.: US 10,764,719 B2
(45) Date of Patent: Sep. 1, 2020

(54) INTERACTIVE PLATFORMS TO SHARE INFORMATION AND DISSEMINATE MESSAGES

(71) Applicant: Leo T. Abbe, New York, NY (US)

(72) Inventor: Leo T. Abbe, New York, NY (US)

(*) Notice: Subject to any disclaimer, the term of this patent is extended or adjusted under 35 U.S.C. 154(b) by 0 days.

(21) Appl. No.: 16/413,311

(22) Filed: May 15, 2019

(65) Prior Publication Data

US 2019/0357012 A1 Nov. 21, 2019

Related U.S. Application Data

(60) Provisional application No. 62/672,137, filed on May 16, 2018.

(51) Int. Cl.
| | |
|---|---|
| *H04W 4/029* | (2018.01) |
| *G06F 16/958* | (2019.01) |
| *G06F 16/955* | (2019.01) |
| *G06K 19/06* | (2006.01) |
| *G06K 7/12* | (2006.01) |

(52) U.S. Cl.
CPC .......... *H04W 4/029* (2018.02); *G06F 16/958* (2019.01); *G06F 16/9558* (2019.01); *G06K 7/12* (2013.01); *G06K 19/06028* (2013.01)

(58) Field of Classification Search
CPC .. H04W 4/029; G06F 16/9558; G06F 16/958; G06K 19/06028; G06K 7/12
See application file for complete search history.

(56) References Cited

U.S. PATENT DOCUMENTS

| | | | |
|---|---|---|---|
| 2007/0083323 A1* | 4/2007 | Rosenberg | G01S 5/0027 701/532 |
| 2008/0009349 A1* | 1/2008 | Wolfe | H04L 67/18 463/42 |
| 2014/0256360 A1* | 9/2014 | Busch | H04W 4/029 455/456.3 |
| 2015/0356611 A1* | 12/2015 | Nozawa | G06Q 30/02 705/14.58 |
| 2016/0112829 A1* | 4/2016 | Kalb | H04W 4/06 455/456.3 |
| 2017/0244624 A1* | 8/2017 | Carroll | G06F 16/9537 |
| 2019/0130616 A1* | 5/2019 | Charlton | H04W 4/021 |

* cited by examiner

*Primary Examiner* — Marisol Figueroa
(74) *Attorney, Agent, or Firm* — Cozen O'Connor (57) ABSTRACT

A method to publish information that can preferably only be retrieved by either a select set of users or all users. The information is published on a map, tied to a physical location. Each piece of information is associated with a viewing radius. Retrieval of the published information is based on those other users' physical location. The number of users that retrieve and collect the information can be limited.

19 Claims, 10 Drawing Sheets

Notifications Filter

Colors/choose types

| Happy | Invisible | LOL | In Love | Optimistic |
| Whaat? | Sad | Cool | After Hours | Adventourous |
| Impatient | Peace & Love | | Napping | Hislorical |
| Yummy | Angry | Sarcastic | Gross | Scared |

Rating
Select a range (0-5)

0 — 1 — 2 — 3 — 4 — 5

Ratings
Alert me when Someone rates my Kilroy

Recieve Notifications only from people I follow

Linked Accounts

Sunday January 21

FACEBOOK

Don commented on your photo

Wuzhear
Bleep wuzhear
You can view a nearby kilroy

Calandar
Out for dinner
January 25, 2018
Added by XXX

Mood Color: Happy

Sunday www.football.com

Find: 10 meters

Limit views: OK

| 1 | 2 | 3 |
|---|---|---|
| 4 | 5 | 6 |
| 7 | 8 | 9 |
| . | 0 | ⊠ |

| Latitude | 41.0103174811611 |
|---|---|
| Longitude | -73.7883497682156 |
| Radius (Meters) | 0 |
| Status | Published |
| User | Bippy |
| Remaining Views Count | Remaining Views Count |
| Tag | Optimistic |
| Add Kilroy extension | |
| URL views | 0 |
| Display / Find Trigger | Display / Find Trigger |

Fig. 10

Kilroys

Kilroys List

| Tag selected Kilroys | Make a Collage | Add kilroy Extension | Remove Kilroy Extension |

10
Showing 1 to 10 of 1,195

| | Title | Description | Thumb | Status | Rates | Views | Comments | Actions |
|---|---|---|---|---|---|---|---|---|
| ☐ 1 | Test | | | Published | 0 | 0 | 0 | Rate Media Update Delete Ratings Comment |
| ☐ 2 | Audio test | | | Published | 0 | 0 | 0 | Rate Media Update Delete Ratings Comment |

INTERACTIVE PLATFORMS TO SHARE INFORMATION AND DISSEMINATE MESSAGES

CROSS REFERENCE TO RELATED APPLICATIONS

This application claims priority to and benefit of U.S. Provisional Patent Application No. 62/672,137 filed on May 16, 2018 entitled Interactive Platforms To Share Information And Disseminate Messages, the disclosure of which is hereby incorporated herein by reference in its entirety.

FIELD OF THE INVENTION

The present Invention relates to interactive platforms and more specifically to a platform for users to share information and disseminate messages, advertising, coupons, and the like.

SUMMARY OF THE INVENTION

Users can use their mobile device to publish information that can preferably only be retrieved by either a select set of users or all users. The information is published on a map, tied to a physical location. Each piece of information is associated with a viewing radius. The published information is called a Kilroy. The retrieval of a Kilroy is based on those other users' physical location. The number of users that retrieve and collect the information (Kilroy) can also be limited.

A mobile device user can select the types of geolocation triggered alerts received based on various classifications of the type of information, the quality of the information as judged by other users, and from which set of users the information was published. Further, alerts can be limited for retrieval in a specified order. For example, a specific alert or Kilroy may not be received if a prior specified alert or Kilroy was not received.

Hyperlinks can be embedded into Kilroys. These Kilroys can then be tracked so that the initial poster can track a number of visitors to the web page from that Kilroy. From this data, it is easily determined how physical traffic patterns can translate into web traffic.

According to one aspect of the invention, an administrator dashboard is provided. Using the dashboard, an Administrator can publish a plurality of Kilroys. The Kilroys can each contain a URL to a website. Dashboard functionality is provided that automatically converts the URL into a unique URL for each of the plurality of Kilroys so that each Kilroy has a unique URL, based on its Kilroy identifying number. This functionality enables each link in for each specifically located Kilroy to generate a different page of the overall website. This function can be used to disseminate coupons, information, offers, or provide a specific clue to find a next 'invisible' Kilroy in a treasure hunt, or a unique QR code for a specific coupon.

Using the dashboard, the Administrator can string a plurality of Kilroys together such that each Kilroy only appears on a user's map after a "prior" Kilroy has been found and viewed by that user. Using this Administrators can create a contest in which the users, or a set of the users (those that 'follow' the client), can race to find each of the Kilroys until the last one is found by either one or a determined number of "winners."

By combining the 'Invisible' paint color option with the 'Hide Kash' function, users can virtually hide gifts in actual physical locations which can only be found by either the first of their "Followers" or anyone who wander within the findable radius of that Kilroy, depending on whether the Hider is set to "Private" or "Public".

The Application transforms a map into a fully dimensional and sensorial experience by recording or memorializing the geographical context of specific moments or events, whether meaningful or trivial. The Application allows users to capture and document what they are doing and choose which emotions best express their experiences. Users can also hear about other people's adventures, as they live their life's journey each and every day via the other people's posts.

Using the Application, an ordinary map becomes canvassed with colored pins called "Kilroys" that each tell a story. The colors describe the mood, and tapping a Kilroy shows the author and the dialogue amongst its various encountering users.

When a user visits a particular Kilroy's location the user can engage with others to experience the fun. Preferably, users can only view and collect colored stories when they are within a predefined radius of a kilroy and contribute to the discussion with comments about, and rate the experience of, that Kilroy. In other words, once they have found and collected it, they can be anywhere when then rate or comment on it.

The Application allows a user to record video, take photographs, leave messages, or tell stories in places around your city or neighborhood or places visited that can only be viewed by other users near the place it was painted. Painting with a color allows other users to know the Kilroy's mood and to track it down on the map. Spraying in invisible paint allows you to paint anonymously, and hide the Kilroy from the map, forcing other users to actually stumble upon it! Leave the paint layer counter at infinity when you spray, and your Kilroy will never disappear. Don't want a lot of people to see it? As long as you have Kash or credits, try limiting the paint layers. After that number of layers have been viewed, the Kilroy will disappear from the map.

DETAILED DESCRIPTION

Initially, to use the application, a user will go to an app store and download the application. Once downloaded, the application is installed and registered. Registration ensures that a post is associated with a specific user. Once registered the app can be launched. Preferably, a user signs in to the app using a username and password, biometric data, or the like. Once the app has been launched and the user has signed in, the user can look for other user's Kilroy posts or paint their own Kilroy's. When a Kilroy is painted, the relevant data regarding the Kilroy such as the user input data as well as the Kilroy location is uploaded to a server. The server is accessible to all users so that the Kilroy and its associated data can be viewed by all registered users, within the parameters of the original poster's selections. Preferably the data communication between the users and the servers are encrypted.

The servers are accessible by mobile devices which, when being used, can find Kilroy's painted at a given location. Additionally, the servers are accessible to other devices which can be used to paint Kilroy's at multiple locations for a campaign, treasure hunt, or the like.

Figure 1:
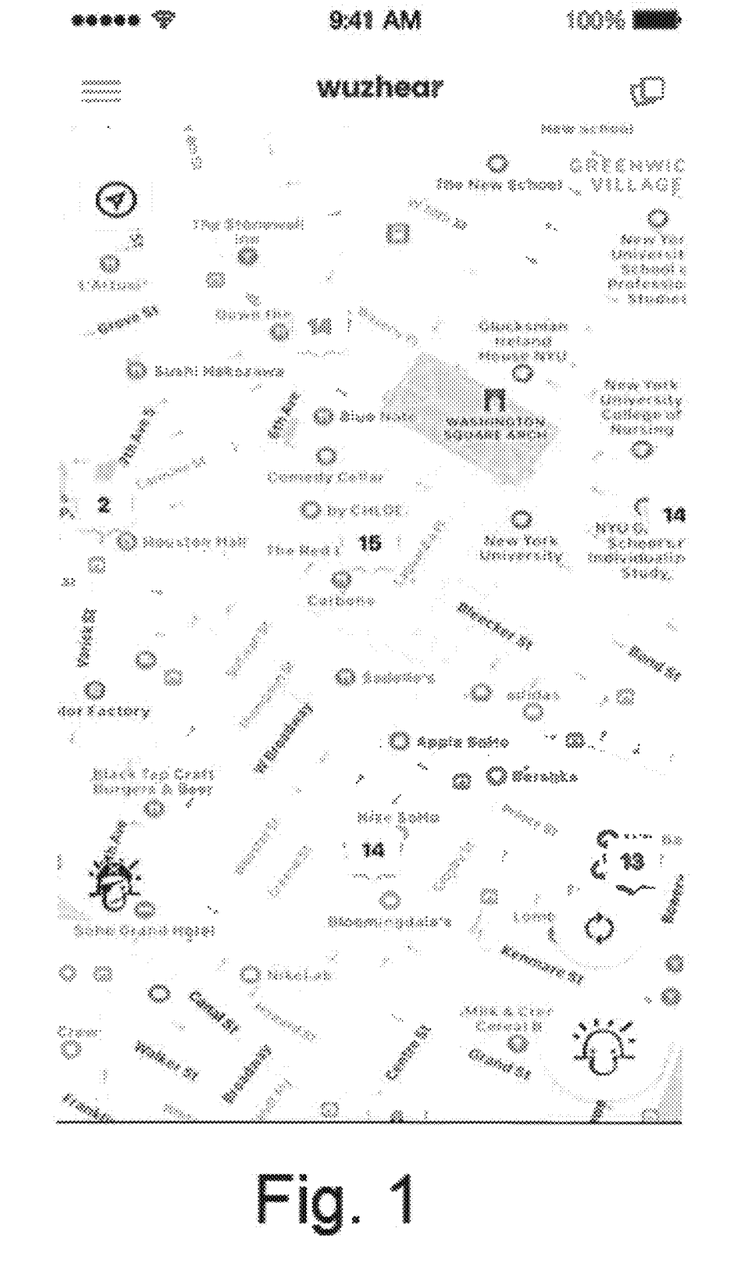
FIG. 1 is a published information (Kilroy) map.
Figure 2:
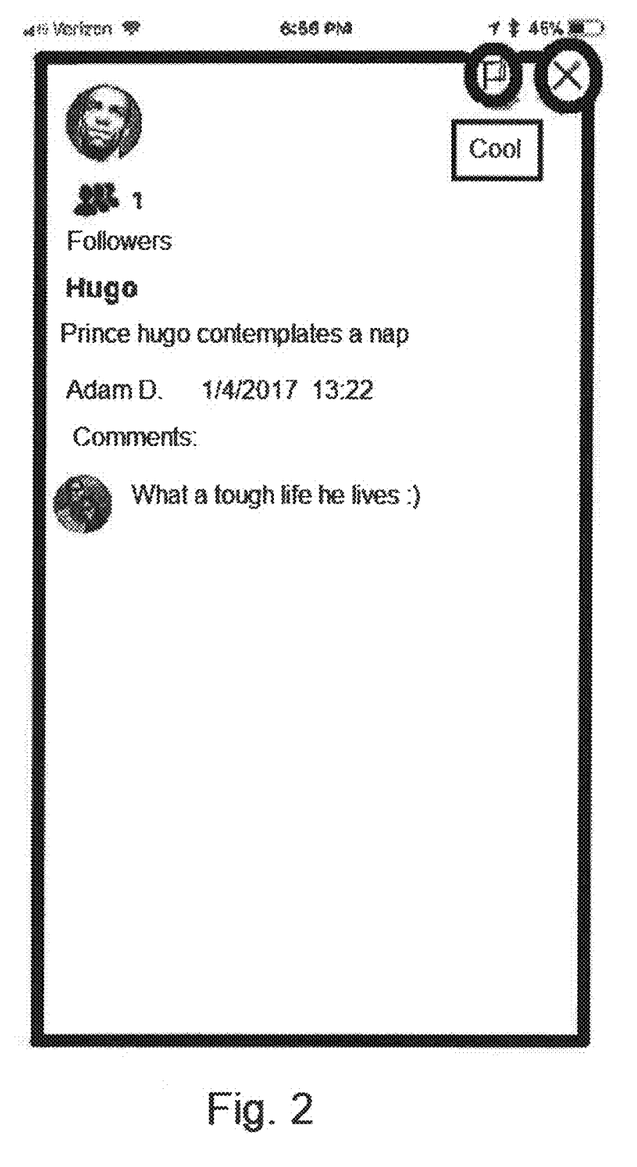
FIG. 2 is a published information (Kilroy) post.

FIG. 1 is a published information (Kilroy) map. The map screen is your home screen. Preferably, the application uses GPS to determine user's location and then displays all viewable Kilroy pins in their respective locations near user. Individual Kilroys are displayed at their respective locations. If more than one Kilroy is at a given location or clustered around a given location, the map is populated with a number pin. Number pins represent clusters of Kilroy pins in a location. A user can zoom in on a map location to see each individual Kilroy. Similarly, as a map is zoomed out, Kilroy clusters are formed and the map is populated with number pins. Each pin can be selected by tapping to view the published information (Kilroy) as shown in FIG. 2. As shown a menu button is present that allows a user to navigate the Application. For Example, the menu allows a user to return to the home screen, view collected Kilroys, see followers, send and receive messages, invite friends, enter a settings screen, view a help menu, check for messages such as another user commenting on one of said user's Kilroys, and the like.

In the settings screen, a user can choose to block their profile so that only friends can view published Kilroy's. Users can also block unwanted users. In one embodiment, the user is alerted when other Kilroys of a selected genre are nearby or Kilroys of a specific rating are nearby. Other setting options include alerting a user when a hosted Kilroy is rated and limiting who can send a notification or comment on a specific Kilroy. In one embodiment of the invention a number of discovered and collected Kilroys is displayed on the homepage. Preferably, proximity is determined by the "painter" who choosing a radius of the Kilroy during the painting process.

FIG. 2 is a published information (Kilroy) post. Users can tap on any pin to view details of the Kilroy. Details include, but are not limited to, title of the post, date and time it was created (painted), who painted it, how many followers they have, average star rating and number of times rated, and comments from people that have viewed it. In a preferred embodiment, the one thing user cannot view is the actual post. The actual post can only be viewed if the user goes within close proximity of where it was painted.

Figure 3:
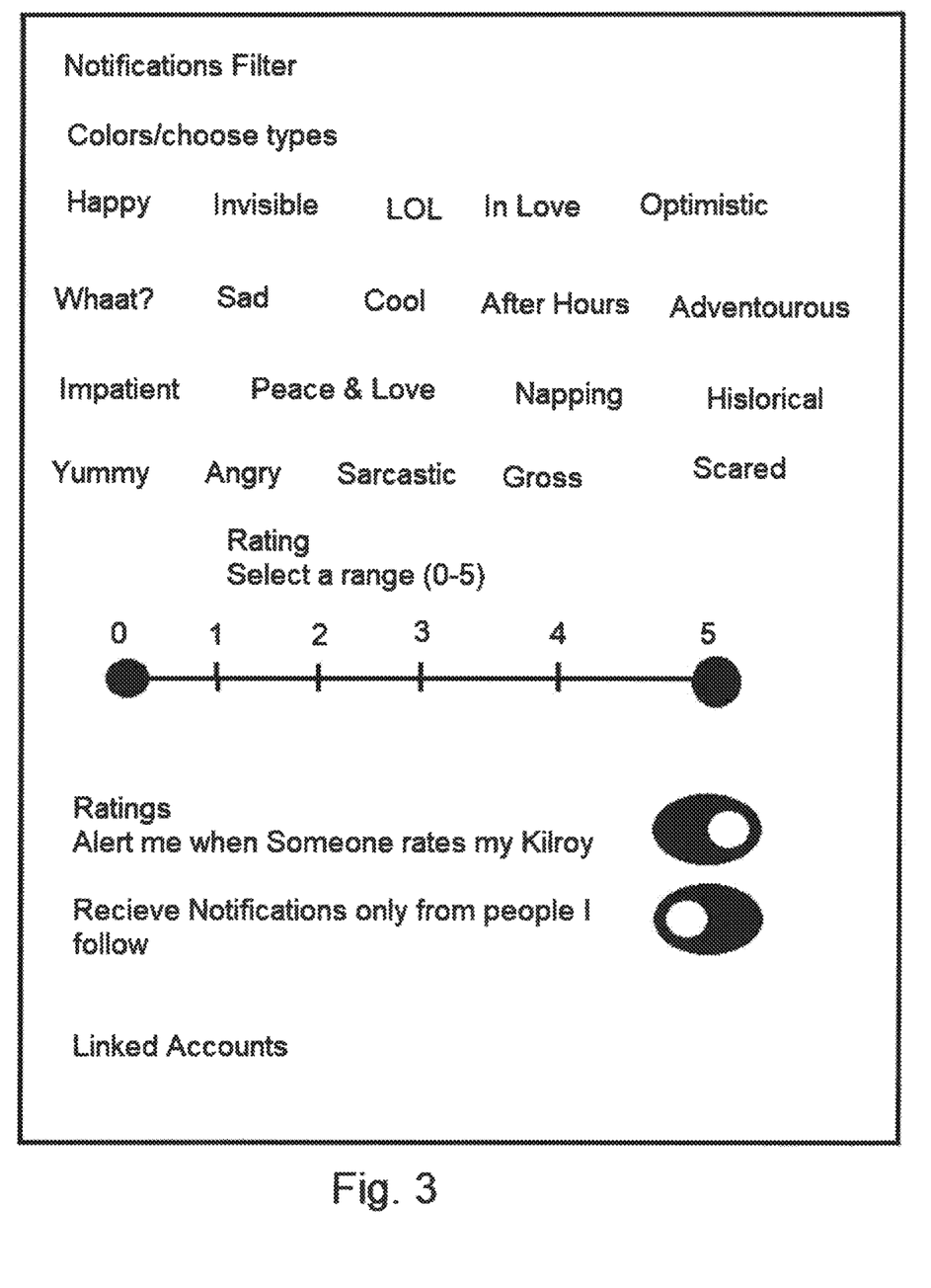
FIG. 3 is a published information (Kilroy) setting screen.

FIG. 3 is a published information (Kilroy) setting screen. Users can adjust the 'Settings' to tell the Application to alert them when certain events occur. Alerts can be based on any combination of Kilroy colors, which correspond to mood settings, average rating, whether or not a Kilroy was painted by someone they follow, or the like. Alerts allow a user to turn on the app each morning and then go about their day. If there is something interesting to see, the Application will alert them. For example, a user can limit alerts to Kilroys categorized as 'In Love' or 'Yummy' with an average rating of at least 3 stars.

Figure 4:
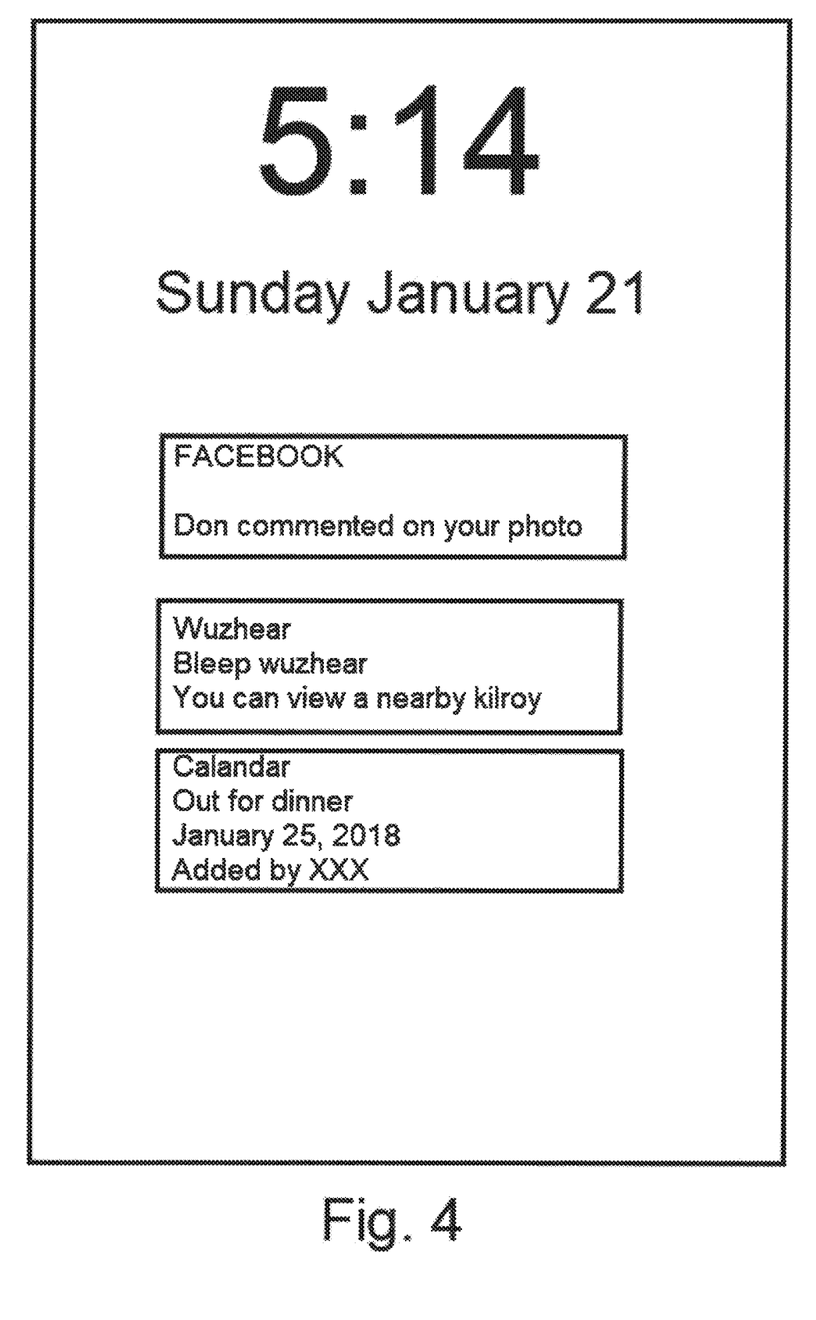
FIG. 4 is a published information (Kilroy) notification screen.

FIG. 4 is a published information (Kilroy) notification screen. As shown, like other Applications, notifications are presented in accordance with a user's settings. As discussed above, notifications can be all inclusive or modified according to a user's preference.

Figure 5:
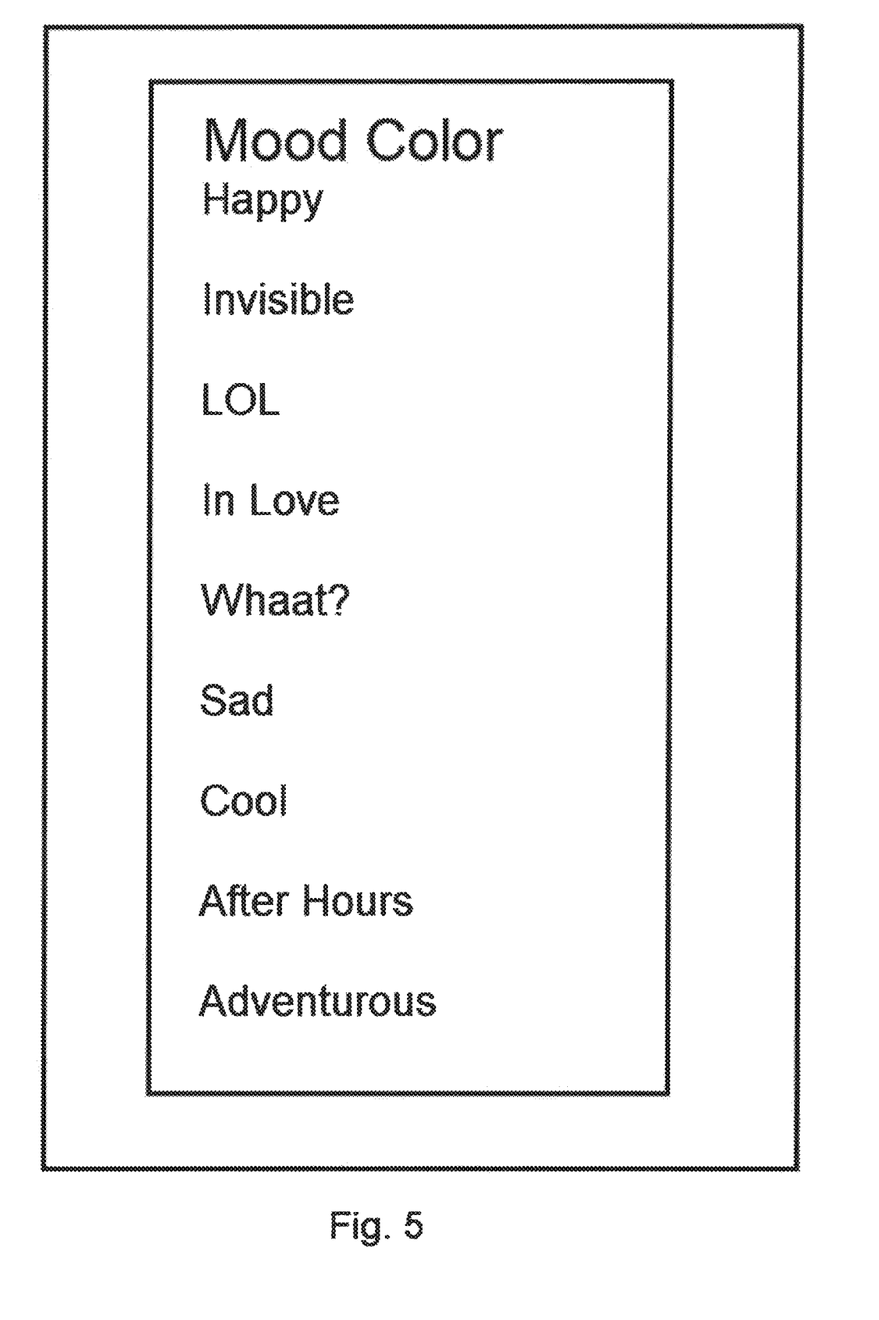
FIG. 5 is a first step to create a published information (Kilroy) post.

FIG. 5 is a first step to create (paint) a published information (Kilroy) post. First, a photo is snapped or video is recorded. Then a color or mood is selected. Using 'Invisible' makes the post anonymous and leaves no visible pin on other user's maps. Users have to literally find these Kilroys by being near them.

Figure 6:
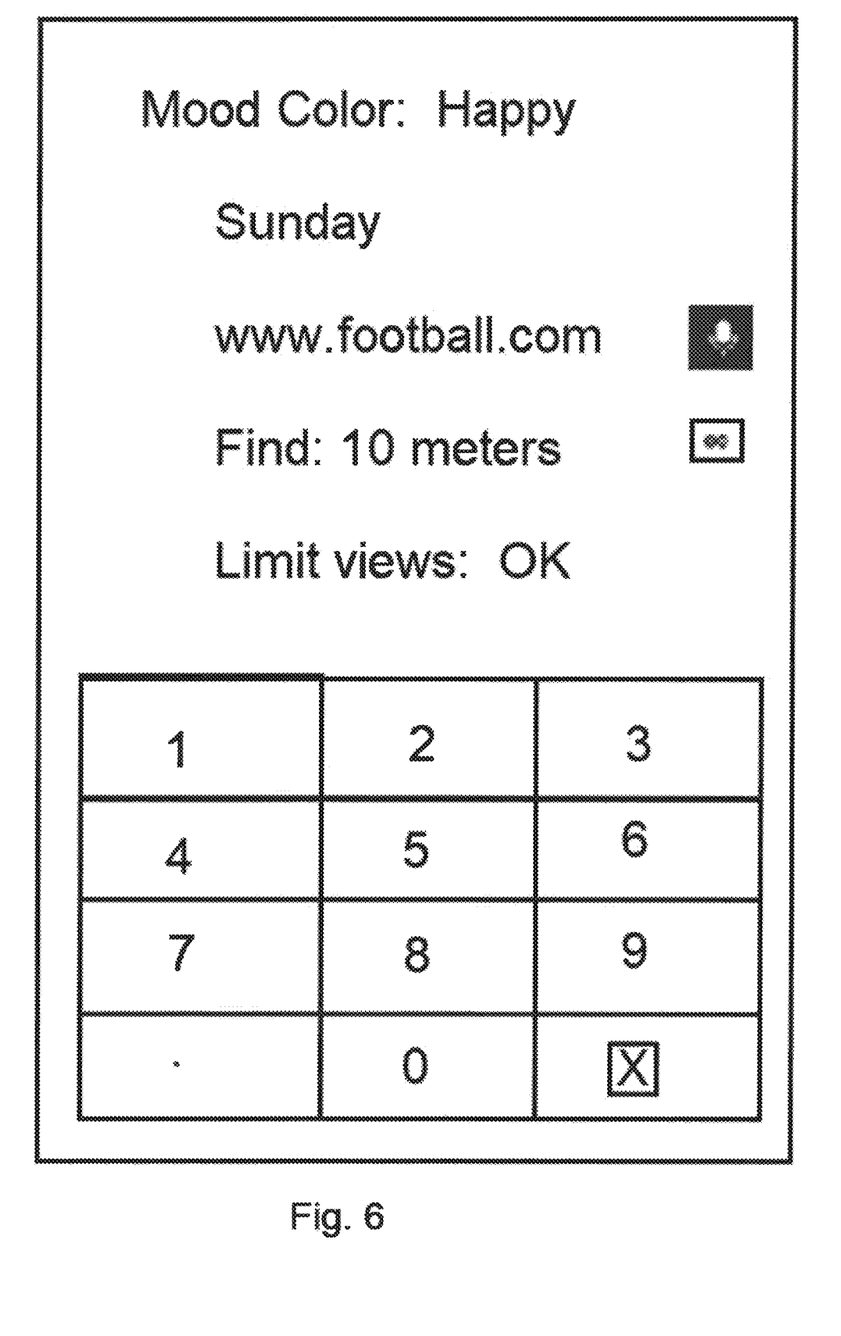
FIG. 6 is a second step to create a published information (Kilroy) post.

FIG. 6 is a second step to create a published information (Kilroy) post. The Kilroy can be titled. In one embodiment, the user can add a URL to the description. The user can also choose the findable radius. Users can also limit the number of views of a given Kilroy from 1 to infinite.

Figure 7:
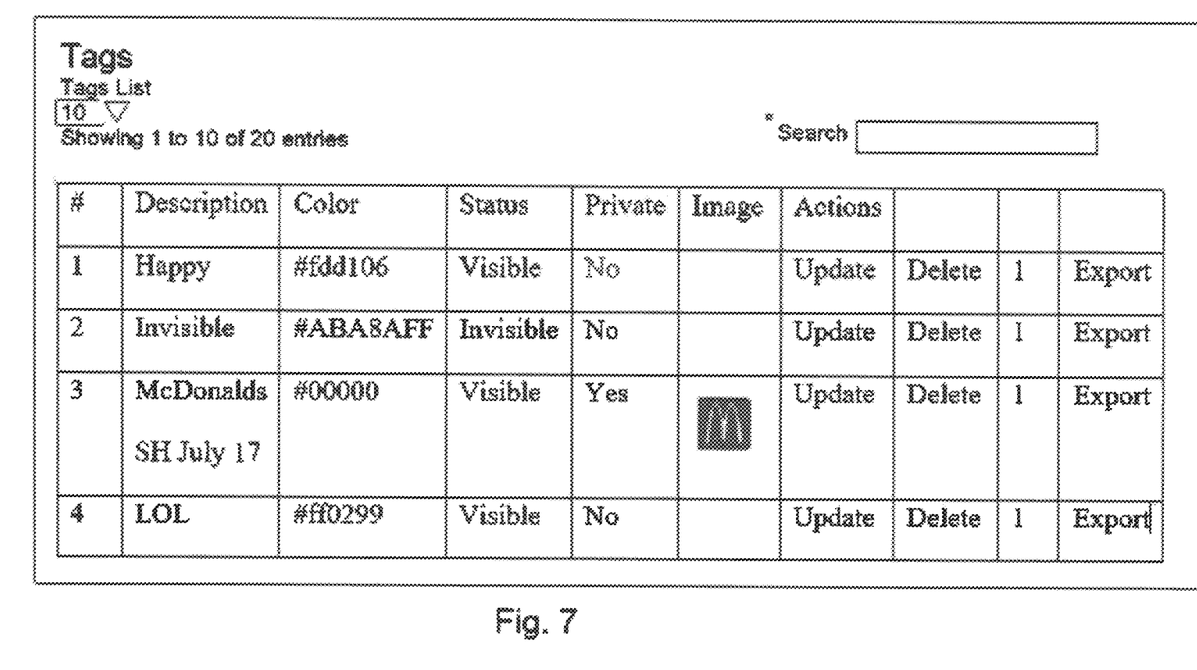
FIG. 7 is a published information (Kilroy) treasure hunt.

FIG. 7 is a published information (Kilroy) treasure hunt. The user, using a dashboard interface or content management system (CMS), can create an overall campaign to find Kilroys. In one embodiment, only administrators can access the dashboard function. Thus, treasure hunts and the like can be pushed to users without a user having to be present at a given location to paint a Kilroy. In one embodiment, the campaign is a treasure hunt, leading from one clue (Kilroy) to another. As shown, the user enters at least a description, color, status, and visibility option for each clue. An image can be associated with each Kilroy to be painted on the map. Because Kilroy's can be visible or invisible, some Kilroy's can only be found if a user is near the specific invisible Kilroy. In one embodiment, the Kilroy would contain a message leading users or searchers to the next Kilroy that is the clue in the treasure hunt. At the end of the treasure hunt, the last Kilroy can be a coupon or QR code for a prize. The final Kilroy can have a finite number of views so that only a predetermined number of coupons or prizes will be given.

Figure 8:
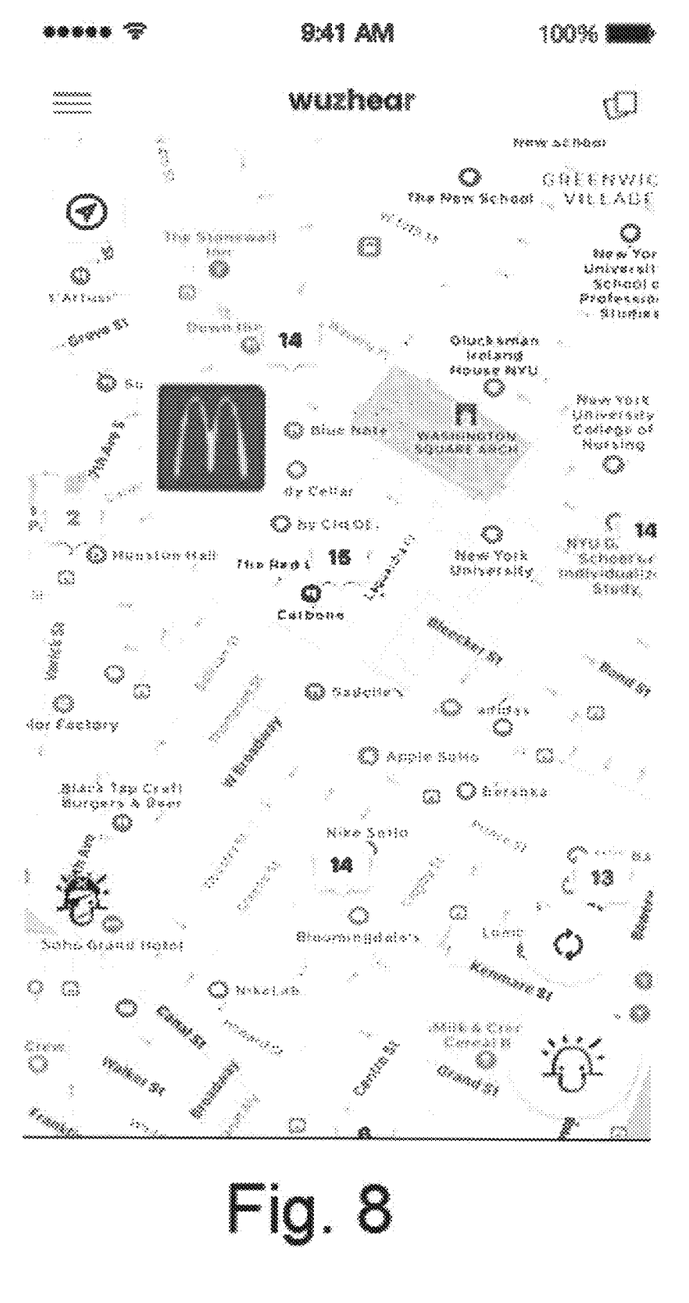
FIG. 8 is a published information (Kilroy) logo pin.

FIG. 8 is a published information (Kilroy) logo pin. As shown in FIG. 8, private tags allow a user to use a logo instead of a colored pin. Using the treasure hunt example of FIG. 7, McDonald's can use their logo for a pin for all visible pins. Additionally, the invisible pins can be logos which are only seen when the user finding the pain is within a specified radius.

Figure 9:
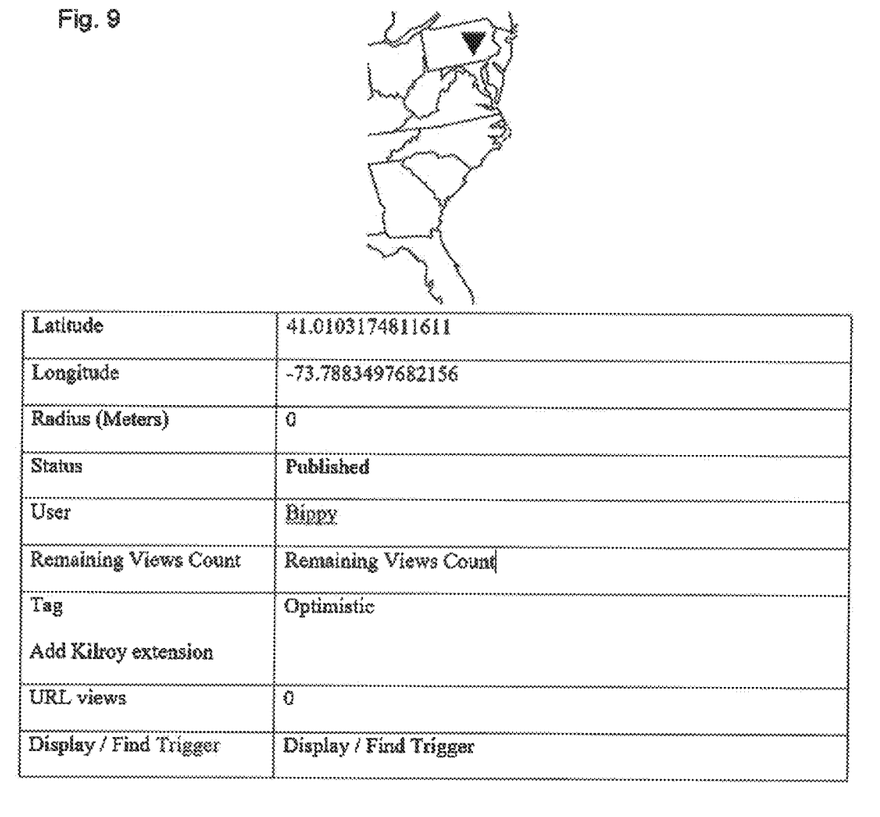
FIG. 9 is a published information (Kilroy) campaign.

FIG. 9 is a published information (Kilroy) campaign for each part of a promotion. The content management system is used to remotely paint promotional Kilroy's at various locations. For example, Kilroy's are painted at McDonald's locations in a specific region. A URL for the contest website is added to each Kilroy. Each Kilroy will have a specific URL so that it is known where the user picked up a Kilroy. In a preferred embodiment, each Kilroy will appear only when a prior display/find trigger Kilroy is found. In this manner, the Kilroy's appear sequentially so that they can only be found in a specified order.

Figure 10:
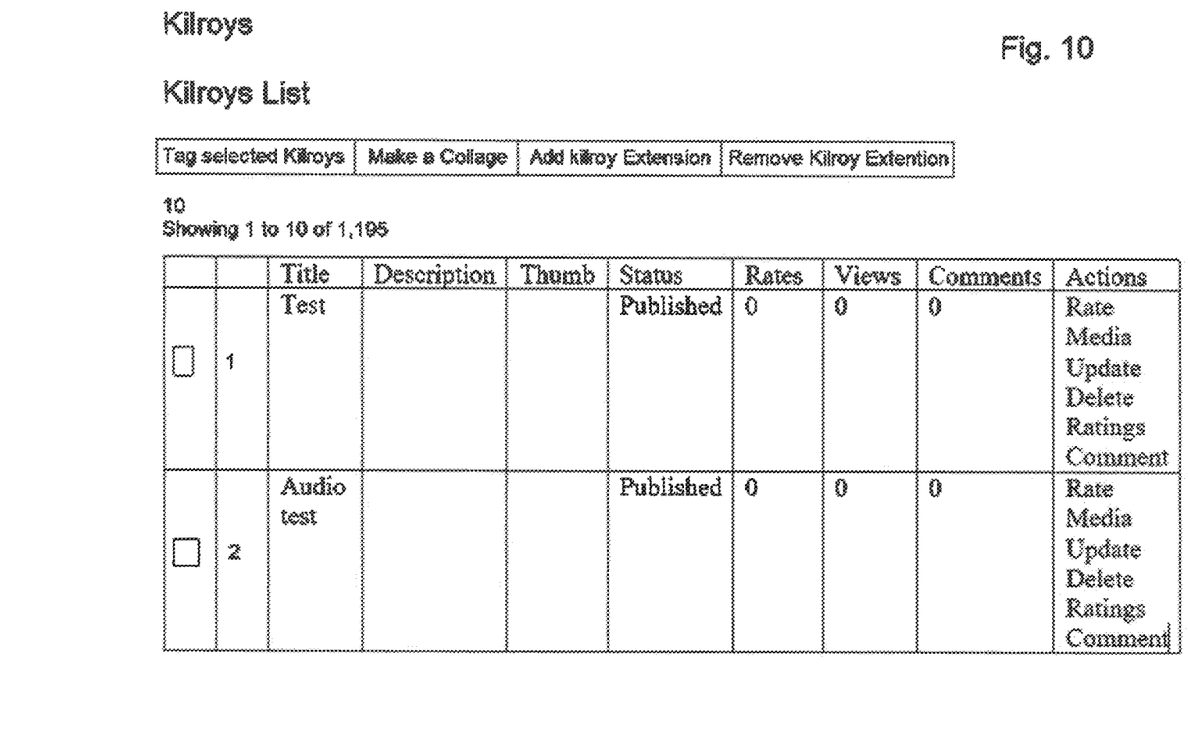
FIG. 10 is a published information (Kilroy) list.

FIG. 10 is a published information (Kilroy) list. After painting all the campaign Kilroys remotely using the CMS, the administrator can select all of the Kilroys and use the 'Add Kilroy Extension' feature to add "/Kilroy #" (for instance www.treasurehunt.com/1432) to the URL listed in each Kilroy description. This unique URL allows each found Kilroy to direct the user to a unique sub-page within the campaign website. Each sub-page could then be a unique QR code with a coupon for a different product, thereby allowing them to determine which coupons are found by exact location.

In one embodiment, users are rewarded for painting and/or finding Kilroys. By using 'Invisible' paint. Kilroys can include virtual gifts including Kash, coupons, cryptocurrency, or the like. In one embodiment, painting Kilroys accrues Kash or other reward. In one embodiment, Kash can be converted to currency or other real-world rewards.

According to one aspect of the invention, the more users that play, participate, or use the application, the bigger a cash prize can become. This feature is called a PowerKash Hunt. During a PowerKash Hunt a prize amount that is hidden under a winning Kilroy increases based on a specific trigger. The increase can be a linear dollar value increase or an exponential increase, or the like. In one embodiment, a coupon value increases with each trigger event. The trigger can be each time a specific "trigger" Kilroy is found by another user. For example, the trigger Kilroy can be a starting line for a quest, the first Kilroy in a series, a specific Kilroy in the series, or the like. Due to the growth potential of the final prize, whether it is a cash prize, coupon value, point award, or the like, users are incentivized to recruit their network of friends and followers to search and find the specific trigger Kilroy. It should be noted that one or more trigger Kilroys may be present in a hunt or quest. In one embodiment, Kilroy searches or PowerKash Hunt can be used by a business to drive customer foot traffic. For example, a business could pay to have a trigger Kilroy located in their physical establishments or, if they have multiple establishments, multiple trigger Kilroys, each providing a same or different increase factor.

It is to be understood that the invention is not limited to the exact details of construction, operation, exact materials or embodiments shown and described, as obvious modifications and equivalents will be apparent to one skilled in the art; for example, the entire cantilever strap could be provided with a shock absorbing pad disposed upon its lower surface. Accordingly, the invention is therefore to be limited only by the scope of the appended claims. While the specific embodiments have been illustrated and described, numerous modifications come to mind without significantly departing from the spirit of the invention.

I claim:

1. A method of publishing information on a mobile device, comprising:
   receiving a selected information to be published by a transceiver of the mobile device;
   receiving a location to be associated with the selected information;
   associating the selected information with the location;
   publishing a marker representing the selected information on a map at the location for display on a display of the mobile device; and
   assigning a viewing radius to the marker and the selected information on the map,
   wherein the marker and selected information are hidden and can only be retrieved by a user and the mobile device physically located within the viewing radius from the selected location;
   verifying a current location of the user and the mobile device; and
   providing the marker and selected information to the user only when the user and the mobile device is within the viewing radius.

2. The method of publishing information according to claim 1, further comprising: setting a number of times the selected information can be retrieved.

3. The method of publishing information according to claim 1, further comprising: specifying a class of users that can retrieve the selected information.

4. The method of publishing information according to claim 1, further comprising: providing a triggered alert based on at least one of a classification of the selected information, a geolocation of the user; a geolocation of the selected information; a quality of the selected information as judged by other users, and a provider of the selected information.

5. The method of publishing information according to claim 4, wherein there is a plurality of selected information and each respective item of selected information is provided in a specified order.

6. The method of publishing information according to claim 5, wherein the specified order is determined by a provider of the selected information.

7. The method of publishing information according to claim 1, wherein the selected information comprises a hyperlink.

8. The method of publishing information according to claim 7, wherein physical traffic patterns of users are determined from the selected information based at least in part on one or more of access to the hyperlink and the selected information provided to the user.

9. The method of publishing information according to claim 1, wherein each of the selected information comprises a unique URL.

10. The method of publishing information according to claim 9, wherein the URL is configured to at least one of disseminate a coupon, disseminate information, disseminate an offer, provide a specific clue to find a next clue in a treasure hunt, and a unique QR or bar code for a specific coupon.

11. The method of publishing information according to claim 1, wherein the selected information is one of public and private.

12. The method of publishing information according to claim 1, wherein the selected information is color coded.

13. The method of publishing information according to claim 12, wherein the color code is designated by a provider of the selected information.

14. The method of publishing information according to claim 1, wherein the selected information is at least one of a video, a photograph, and a message, that can only be provided to other users near a place it was created.

15. The method of publishing information according to claim 1, wherein a respective selected information has an initial value.

16. The method of publishing information according to claim 15, wherein the initial value is increased based on providing on one or more events occurring.

17. The method of publishing information according to claim 9, wherein each unique URL is based at least on map coordinates.

18. The method of publishing information according to claim 17, wherein the map coordinates correspond to related specific content.

19. The method of publishing information according to claim 18, wherein the related specific content is available in a specified order and is incremented in a predefined manner.

* * * * *